United States Patent

[11] 3,592,304

| [72] | Inventor | Charles H. Thompson<br>Pittsboro, Ind. |
|---|---|---|
| [21] | Appl. No. | 840,866 |
| [22] | Filed | Apr. 3, 1969<br>Division of Ser. No. 721,271, Apr. 15, 1968, now abandoned. |
| [45] | Patented | July 13, 1971 |
| [73] | Assignee | General Motors Corporation<br>Detroit, Mich. |

[54] FLUID DELIVERY CONTROL SYSTEM
2 Claims, 2 Drawing Figs.

[52] U.S. Cl. ............................................. 188/264 P,
60/52 B, 188/264 D, 192/113 B
[51] Int. Cl. ....................................................... F16d 65/78
[50] Field of Search........................................... 188/71.6,
264.2, 264.22, 264.25, 264 P; 192/113 B; 60/52 B

[56] References Cited
UNITED STATES PATENTS

| 2,953,040 | 9/1960 | Christenson et al. | 188/264 (.22) X |
| 2,956,649 | 10/1960 | Kelly | 192/113 (.2) X |
| 3,216,769 | 11/1965 | Hicks et al. | 192/113 (.2) X |
| 3,259,216 | 7/1966 | Klaus et al. | 192/113 (.2) X |
| 3,351,169 | 11/1967 | McIndoe | 192/113 (.2) X |

*Primary Examiner*—George E. A. Halvosa
*Attorneys*—E. W. Christen, A. M. Heiter and R. L. Phillips

ABSTRACT: A fluid delivery control system is disclosed as controlling the delivery of coolant from a coolant pump to the output brake of a tracklaying vehicle. The control system according to the preferred embodiment has a pilot valve operated by the brake's apply linkage to control the operation of a fluid motor. The motor effects positive action of a check valve in the coolant pump's suction line to air bleed the pump to prevent coolant delivery to the brake during brake disengagement. The check valve is spring biased to connect the coolant pump's suction line to the pump's reservoir during brake engagement.

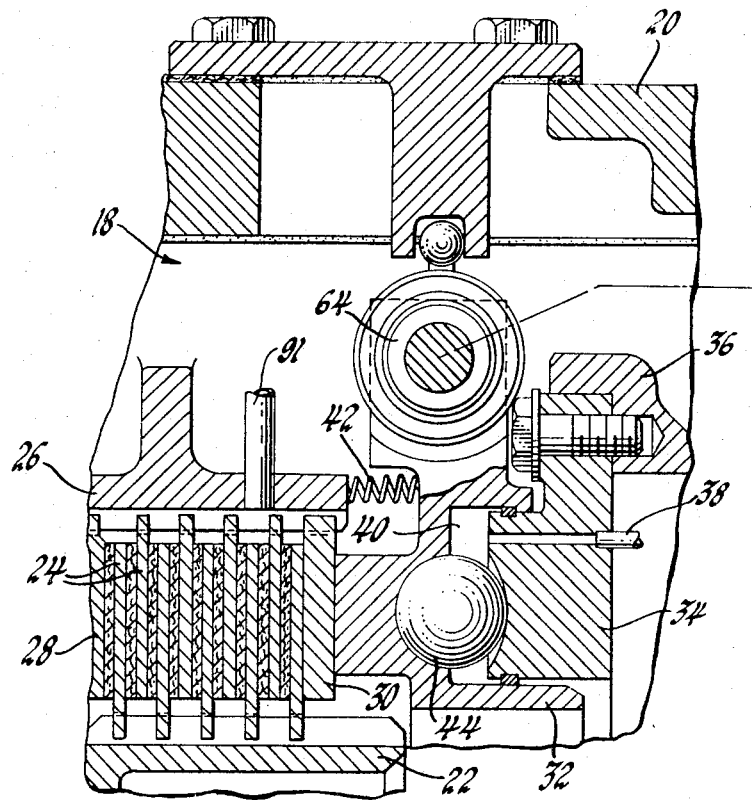
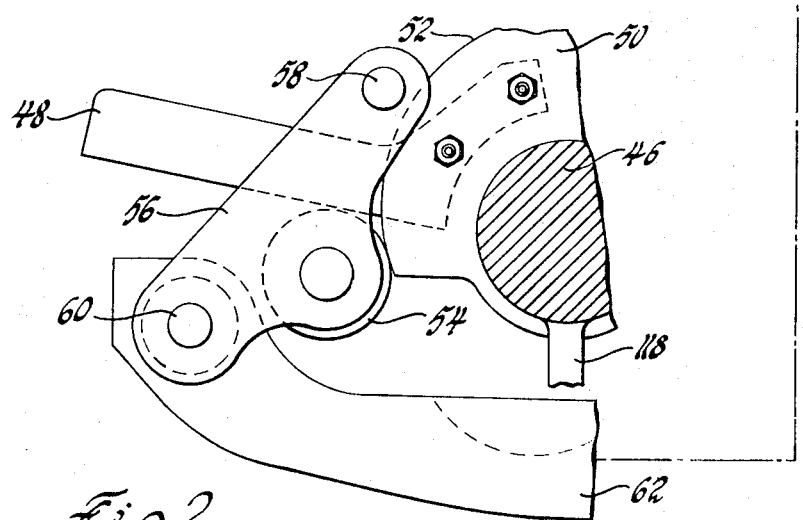
Fig.2
INVENTOR.
Charles H. Thompson

FLUID DELIVERY CONTROL SYSTEM

This application is a division of U.S. Pat. application Ser. No. 721,271 filed Apr. 15, 1968, now U.S. Pat. No. 3,495,404.

This invention relates to fluid delivery control systems and more particularly to air bleed systems providing positive control of fluid delivery from a pump.

In tracklaying vehicles having a power train which transmits power via two outputs to the tracks, it is desirable to provide coolant delivery to the power train output brakes only when they are engaged. This may occur when both output brakes are engaged simultaneously for vehicle braking or separately for brake-type steering. Otherwise, coolant delivery to the brakes when they are disengaged results in power loss because of fluid shear in the coolant passing between the disengaged friction brake surfaces which have relative rotation. Examples of structure providing for coolant delivery only during brake engagement are found in U.S. Pat. No. 2,912,884 issued to Christenson et al. and entitled "Transmission" and copending U.S. Pat. application Ser. No. 438,634, now U.S. Pat. No. 3,378,119, filed Mar. 10, 1965 in the name of Schaefer and entitled "Transmission."

The fluid delivery control system according to the present invention is illustrated as controlling the delivery of coolant from a coolant pump to the brake of a tracklaying vehicle. The system in the preferred embodiment employs a check valve which is operable to connect the pump's suction line to either the coolant pump's reservoir or atmosphere. The check valve has a spring whose force is employed to bias the check valve to a coolant delivery position connecting the pump's suction line to the reservoir while closing the suction line to atmosphere. A fluid motor whose output force is opposite the spring force is powered by a signal pressure to move the check valve against the spring force to a vent position connecting the pump's suction line to atmosphere while closing the suction line to the reservoir. With the check valve in the vent position the coolant pump is vented so that it pumps only air. The operation of the fluid motor is controlled by a pilot valve which is conditionable to connect the motor to either the signal pressure source or exhaust. The operation of the pilot valve is controlled by the brake's apply linkage. When the brake is disengaged the pilot valve is held against a spring bias by the brake linkage in a brake-disengaged signal position delivering signal pressure to the fluid motor. The motor then positively conditions the check valve in its vent position to air bleed the pump to prevent coolant delivery to the brake. When the brake's apply linkage is operated to engage the brake it permits the pilot valve to be moved by its spring bias to a brake engaged signal position disconnecting the signal pressure from the motor while exhausting the motor. Then the motor has no output force and the check valve is moved by its spring bias to the coolant delivery position so that the pump delivers coolant to the brake during the brake engagement. An advantage of the present invention is that pump vacuum is positively prevented from moving the check valve to its coolant delivery position when the brake is disengaged.

An object of the present invention is to provide a new and improved fluid delivery control system.

Another object of the present invention is to provide a pilot-operated motor positively controlling the air bleeding of a pump.

Another of the present invention is to provide a coolant pump air bleed system employing a pilot valve operated by brake apply linkage during brake disengagement to positively enforce by motor operation on a normally spring biased check valve the air bleeding of a pump to prevent coolant delivery from the pump to the vehicle brake while permitting normal check valve operation for coolant delivery during brake engagement.

These and other objects of the present invention will be more apparent from the following description and drawing in which:

FIG. 2 shows a typical brake structure with mechanical brake linkage to which the FIG. 1 system is particularly suited for use.

Figure 1:
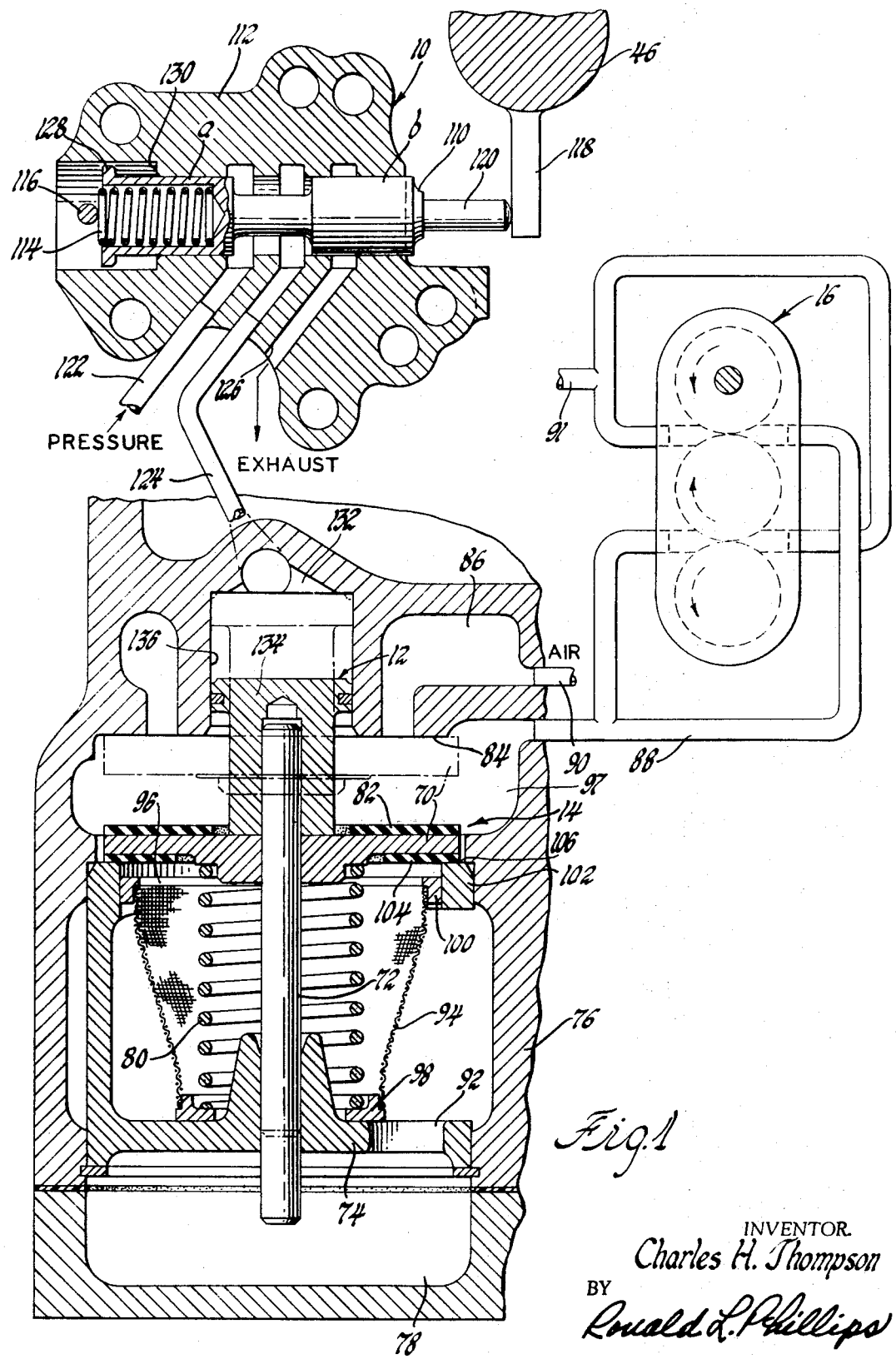
FIG. 1 shows the preferred embodiment of the fluid delivery control system constructed according to the present invention.

Referring to FIG. 1, the fluid delivery control system generally comprises a pilot valve 10 controlling the operation of a hydraulic motor 12 to provide positive control over a check valve 14 establishing venting and coolant availability relative to a pump 16. The control system as illustrated in the preferred embodiment for use in controlling coolant delivery to an output brake in a tracklaying vehicle. Since there are two output brakes in such a vehicle, it will be understood that two of my systems controlled by the respective brakes are employed in the complete tracklaying vehicle arrangement. In using my arrangement in the tracklaying vehicle, the pump 16 may be driven by the input to the range gearing of the vehicle's power train, e.g. drivingly connected to the converter turbine in the case of the power trains employing a hydrodynamic torque converter. With such a pump drive, the pump will be driven back through the range gearing by the power train output during overrunning conditions. To meet large coolant delivery requirements, the pump may be of the three-gear element positive displacement type shown which is conventional.

In FIG. 2 there is shown a typical tracklaying vehicle output brake with which my control system is connected to operate, the brake assembly being generally designated as 18. An example of the brake assembly and also brake apply linkage with which my system may be employed is shown in U.S. Pat. No. 3,331,476 issued to Livezey and entitled "Wear Adjuster." The brake assembly 18 of which only the upper half is shown, is one of two identical output brakes in the vehicle. The brake assembly 18 is housed by the power train housing 20 and when engaged, brakes a rotatably mounted hub 22 connected to one of the two power train output shafts by grounding the hub to the power train housing.

The brake has a plurality of friction plates 24 having alternate plates splined at their inner radius to hub 22 and intermediate plates splined at their outer radius to a drum 26 integral with the web of the power train housing. The plates are sandwiched between a thrust plate 28 and a pressure plate 30, thrust plate 28 being splined at its outer radius to drum 26 and retained thereon against the forces of brake engagement by suitable retaining means not shown. Pressure plate 30 is splined at its outer radius to drum 26 and is free to advance to apply the forces of brake engagement to the brake plates to ground the hub 22 to the housing. Advancement of pressure plate 30 for brake engagement is accomplished by a motor assembly comprising an external annular piston 32 received in sealing engagement on an internal cylinder 34 secured to support member 36 of the housing. Movement of piston 32 for brake engagement is accomplished either hydraulically or mechanically depending on the type of braking desired.

The piston 32 is advanced hydraulically when supplied with fluid pressure from any suitable source via a line 38 to the motor chamber 40. On exhaust of the motor chamber, retraction springs 42 retract the piston for brake disengagement.

Mechanical brake engagement which is the type most desired for the particular brake usage is provided by a mechanical apply linkage comprising a brake apply shaft 46 which is suitably supported for rotation by the power train housing. A link 48 rigidly connected by cam 50 by the brake apply shaft 46 is controlled from a remote position by the operator to rotate shaft 46 and connected cam 50 for mechanical brake engagement. Cam 50 has a cam surface 52 which contacts a cam roller 54 journaled on a lever arm 56. Arm 56 is pivoted at one end by pin 58 to the power train housing. Lever arm 56 is pivoted at the other end by a pin 60 to one end of a brake apply arm 62. The other end of the arm 62 is connected by a ball and socket connection 64 to pull on the piston 32 to effect its movement. To apply the bake, link 48 is swung counterclockwise as viewed in FIG. 2 to rotate shaft 46 and connected cam 50 in the counterclockwise direction. Cam surface 52 through its contact with cam roller 54 then pivots the lever arm 56 counterclockwise about pin 58 resulting in slight swinging movement of the connected arm 62 pulling this arm leftwardly. The ball and socket connection of arm 62 with piston 32 permits the swinging of arm 62 and piston 32 is rotated to advance on its ball ramps and balls for brake engagement. At brake disengagement, the apply force acting on link 48 is released and suitable spring means not shown return the brake apply shaft 46 to its disengaged or retracted position shown in FIG. 2, while the piston retraction springs retract piston 32. The brake assembly and mechanical apply linkage may be seen in greater detail in the above-noted Livezey U.S. Pat. No. 3,331,476.

Describing now in detail the control system associated with the mechanical brake apply linkage, the principle of air bleeding the suction side of a pump while disconnecting the pump suction from its reservoir is employed to stop liquid delivery from the pump without stopping the mechanical motion of the pump. The check valve 14 which in the use shown may also be referred to as a brake coolant suction valve is of the poppet type and comprises a valve head 70 slip fitted on a valve stem 72. Stem 72 is slip fitted at its lower end in a valve guide 74 secured as shown in a housing 76, the valve guide structure 74 at its lower end spanning the coolant pump's reservoir 78 which contains the coolant for the brake. A preloaded spring 80 arranged between the lower end of valve guide structure 74 and the valve head 70 is for biasing the valve to its coolant delivery position shown by the dash lines in FIG. 1. In the coolant delivery position, a valve facing 82 on the upper side of valve head 70 seats on a valve seat 84 to close an atmospheric pressure chamber 86 to the suction line 88 of the pump 16, chamber 86 being vented to atmosphere via a line 90. Pump 16 is connected at its discharge sides by a line 91 to deliver coolant to the brake plates as shown in FIGS. 1 and 2.

In the coolant delivery position of the valve 14, the reservoir 78 is connected via a port 92 in the lower end of the valve guide structure 74 through a protective screen 94 and an annular port 96 to a suction chamber 97 which is continuously connected to the pump's suction line 88. The screen 94 which prevents the passage of objectionable foreign material to the pump has a conical shape and is supported in the housing at its lower end by a collar 98 beneath spring 80 and at its upper end by a collar 100 secured in a ring 102 mounted in the housing. The screen is concentric with the central axis of the check valve structure and surrounds spring 80.

The check valve is moveable from its coolant delivery position downward to an air bleed or vent position shown in solid line in FIG. 1. In the vent position the lower valve facing 104 on valve head 70 seats on a valve seat 106 provided on the upper side of ring 102 to close port 96 to disconnect the reservoir from the suction side of the pump while opening atmospheric pressure chamber 86 to the pump suction side.

Positive control over the operation of the brake coolant pump suction valve 14 and particularly the maintenance of this valve in its vent position is provided by the hydraulic motor 12. Motor 12 is controlled by operation of the pilot valve 10 which for the particular use may also be referred to as the brake signal valve. The brake signal valve comprises a spool valve element 110 having equal diameter lands a and b slidably mounted in a bore provided in valve housing 112. A preloaded spring 114 mounted in the hollow end of the valve element 110 is located between the valve element and a pin 116 secured to the valve housing. Positioning of the valve element 110 is controlled by the brake apply linkage by providing the brake apply shaft 46 with an arm 118 shown in both FIGS. 1 and 2. With the brake 18 disengaged the arm 118 is in a vertical position as shown in both FIGS. 1 and 2. In this arm position the spring 114 holds the valve element 110 in the position shown in FIG. 1 by means of a projection 120 on valve element 110 engaging the arm 118 of the brake apply shaft. This valve position will be referred to as the brake disengaged signal position. In the brake disengaged signal position a line 122 provided with fluid pressure from any suitable source is connected between lands a and b to a brake signal line 124 which is provided for delivering signal pressure to the hydraulic motor. At the same time land b of valve element 110 closes an exhaust line 126 from the brake signal line 124. The fluid pressure for line 122 may be main line pressure in a transmission control system such as in the aforementioned Christenson et al. U.S. Pat. No. 2,912,884.

When the brake linkage is operated to engage the brake, the brake apply shaft 46 is rotated counterclockwise as viewed in FIG. 1 and swings the lower end of arm 118 rightwardly. The valve element 110 by its contact through projection 120 with arm 118 follows the arm by the operation of spring 114. This movement of valve element 110 continue until a stop collar 128 provided on its left end engages step 130 of the counterbore in the left end of the valve housing. This abutment determines the rightmost position of valve element 110 which is the brake-engaged signal position. In the brake-engaged signal position, land a of the valve blocks the line 122 from the signal line 124 while connecting the exhaust line 126 between the lands a and b to the signal line 124 to exhaust the signal line and thus the hydraulic motor.

The fluid delivered to the brake signal line 124 is directed to sealed motor chamber 132 of the hydraulic motor 12. The pressure in motor chamber 132 acts on the top of a piston 134 which is mounted in a cylinder 136 concentric with the central axis of valve 14. Piston 134 is press fitted on the upper end of the valve stem 72 which extends through the valve head 70 and with the fluid pressure supply, piston 134 is in contact with head 70 and is moved downward against the bias of spring 80 to positively condition valve 14 in its vent position. When signal line 124 is exhausted by valve 10, the motor chamber is exhausted and the spring 80 of the valve 14 returns the valve to its coolant delivery position.

OPERATION

When the brake 18 is disengaged, brake signal valve 10 is held in the brake-disengaged signal position shown by spring 114 against arm 118 of the brake apply shaft so that brake signal pressure is delivered to the hydraulic motor 12. The motor 12 then holds the brake coolant suction valve 14 in its vent position shown in solid line closing the pump suction from the coolant reservoir 78 and opening the atmospheric pressure chamber 86 to pump suction. This operation air bleeds the pump so that it delivers air and not coolant to the disengaged brake. The air delivered by the pump is used to belljar the brake cavity thereby preventing friction or power loss due to liquid shear between the brake plates which have relative rotation. With the valve 14 thus positively held in its vent position, pump vacuum is prevented from opening the check valve as might result were there no positive holding action.

When the brake 18 is engaged by the mechanical linkage the brake apply shaft is rotated counterclockwise as viewed in FIGS. 1 and 2 swinging arm 118 rightwardly at its lower end. This permits spring 114 of valve 10 to urge the valve element 110 rightwardly to its brake-engaged signal position disconnecting brake signal pressure from motor 12 while exhausting the motor. This permits spring 80 to move brake coolant suction valve 14 upwardly to its coolant delivery position shown in dashline opening the pump suction to the coolant supply while closing atmospheric pressure from pump suction.

The above described preferred embodiment is illustrative of the invention which may be modified within the scope of the appended claims.

I claim:

1. In a coolant delivery control system for controlling coolant delivery to a brake the combination of a coolant reservoir, a pump having a suction line and a discharge line, said discharge line connected to deliver pump discharge to a brake, check valve means for connecting said suction line to atmosphere while closing said suction line to said reservoir when in a vent position and for connecting said reservoir to said suction line while closing said suction line to atmosphere when in a coolant delivery position, said check valve means including biasing means for biasing said check valve means to said coolant delivery position, brake linkage operable to engage and disengage said brake, and check valve control means operatively connected to said brake linkage and said check valve means and controlled by said brake linkage for positively conditioning and holding said check valve means in said vent position when said brake linkage is operated to disengage said brake and for permitting said check valve biasing means to condition said check valve means in said coolant delivery position when said brake linkage is operated to engage said brake.

2. The coolant delivery control system described in claim 1 and said check valve control means comprising fluid motor means operatively connected to said check valve means for conditioning and holding said check valve means in said vent position when supplied with fluid pressure and for permitting said check valve biasing means to condition said check valve means in said coolant delivery position when the fluid pressure is exhausted, brake signal valve means for delivering fluid pressure to said motor means for delivering fluid pressure to said motor means while closing said motor means to an exhaust when in a brake-disengaged signal position and for discontinuing fluid pressure delivery to said motor means while opening said motor means to said exhaust when in a brake-engaged signal position, said brake linkage and said brake signal valve means having cooperating means for conditioning said brake signal valve means in said brake-disengaged signal position when said brake linkage is operated to disengage said brake and for conditioning said brake signal valve means in said brake engaged signal position when said brake linkage is operated to engage said brake.